US012013007B2

(12) United States Patent
Yilmaz et al.

(10) Patent No.: US 12,013,007 B2
(45) Date of Patent: Jun. 18, 2024

(54) VIBRATION ISOLATION SYSTEM

(71) Applicant: BOGAZICI UNIVERSITESI, Istanbul (TR)

(72) Inventors: Cetin Yilmaz, Istanbul (TR); Ahmet Onur Ozyar, Norrkoping (SE)

(73) Assignee: BOGAZICI UNIVERSITESI, Istanbul (TR)

( * ) Notice: Subject to any disclaimer, the term of this patent is extended or adjusted under 35 U.S.C. 154(b) by 15 days.

(21) Appl. No.: 17/800,917

(22) PCT Filed: Feb. 15, 2021

(86) PCT No.: PCT/TR2021/050131
§ 371 (c)(1),
(2) Date: Aug. 19, 2022

(87) PCT Pub. No.: WO2021/167568
PCT Pub. Date: Aug. 26, 2021

(65) Prior Publication Data
US 2023/0083280 A1    Mar. 16, 2023

(30) Foreign Application Priority Data
Feb. 21, 2020    (TR) ................. 2020/02692

(51) Int. Cl.
*F16F 15/02*    (2006.01)
(52) U.S. Cl.
CPC ........ *F16F 15/022* (2013.01); *F16F 2222/08* (2013.01); *F16F 2228/04* (2013.01); *F16F 2230/18* (2013.01)

(58) Field of Classification Search
CPC ...... F16F 15/022; F16F 2222/08; F16F 2228/04; F16F 2230/18
See application file for complete search history.

(56) References Cited

U.S. PATENT DOCUMENTS 5,016,862 A * 5/1991 Leyshon ................ A61G 3/006
248/564
6,175,989 B1 * 1/2001 Carpenter .............. B64G 1/222
343/915

(Continued)

FOREIGN PATENT DOCUMENTS

JP    2001140981 A    5/2001
JP    2007211503 A    8/2007
(Continued)

*Primary Examiner* — Monica E Millner
(74) *Attorney, Agent, or Firm* — Bayramoglu Law Offices LLC

(57) ABSTRACT

A vibration isolation system includes at least one first region and at least one second region that are positioned mutually, at least one first hinge member engaged with said first region, at least one second hinge member engaged with said second region and at least one lever connected with said first hinge member and said second hinge member to be at least partially movable in the direction of at least one first axis. Accordingly, at least one lever guiding element is used to minimize vibration transmission between the first region and the second region and said lever guiding element is configured to bring an instantaneous center of rotation depending on the input vibration frequency of the first region to be aligned with the second hinge element attached to the second region which is required to be protected from vibration.

14 Claims, 3 Drawing Sheets

(56) References Cited

U.S. PATENT DOCUMENTS

| | | | | |
|---|---|---|---|---|
| 6,752,250 | B2 * | 6/2004 | Tanner | F16F 15/022 |
| | | | | 188/267.2 |
| 7,114,711 | B2 * | 10/2006 | Allaei | D03D 49/025 |
| | | | | 267/136 |
| 8,857,110 | B2 * | 10/2014 | Constantinou | F16F 1/121 |
| | | | | 52/167.2 |
| 9,206,616 | B2 * | 12/2015 | Sarlis | E04H 9/0215 |
| 10,167,993 | B2 * | 1/2019 | Jennings | F16M 11/121 |
| 10,619,699 | B2 * | 4/2020 | Ivanco | E04H 9/0215 |
| 10,641,320 | B2 * | 5/2020 | Lee | F16C 11/12 |
| 2019/0383350 | A1 * | 12/2019 | Shikh | F16M 11/22 |
| 2020/0025272 | A1 * | 1/2020 | Jahromi | F16F 1/025 |

FOREIGN PATENT DOCUMENTS

| | | | |
|---|---|---|---|
| JP | 2013257027 A | 12/2013 | |
| WO | 8803619 A1 | 5/1988 | |

* cited by examiner

VIBRATION ISOLATION SYSTEM

CROSS-REFERENCE TO RELATED APPLICATIONS

This application is the national phase entry of International Application No. PCT/TR2021/050131, filed on Feb. 15, 2021, which is based upon and claims priority to Turkish Patent Application No. 2020/02692, filed on Feb. 21, 2020, the entire contents of which are incorporated herein by reference.

TECHNICAL FIELD

The invention relates to at least one vibration isolation system particularly for use in vibration isolation, comprising mainly at least one first region and at least one second region that are positioned mutually, at least one first hinge member engaged with said first region, at least one second hinge member engaged with said second region and at least one lever connected with said first hinge member and said second hinge member to be at least partially movable in the direction of at least one first axis.

BACKGROUND

Vibration is a term that defines the oscillation movements of a mechanical system or structure about an equilibrium point. During vibrations, energy is alternated between kinetic and potential forms to create the observed oscillations.

Vibrational motion is characterized by its frequency and amplitude. Vibration is generally undesirable since it wastes energy, leads to fatigue failure or structural damage and creates undesired sound and noise.

Free vibration is a type of vibration that occurs in the systems to which an initial motion is provided and is released for oscillation. Forced vibration is a vibration type that occurs when a variable force or motion is applied to excite a mechanical system. The frequency of the vibrational motion depends on the frequency of the applied force or motion in forced vibration; however, the amplitude of the vibration depends both on the mechanical properties of the system and the amplitude of the input force.

Vibrations occur due to various reasons, but in general the vibration sources create negative effects on the structures to which they are connected. It is important to isolate vibrations caused by mechanical, electro-mechanical, pneumatic or hydraulic equipment where comfort is a major consideration. Likewise, vibration isolation is important for preventing mechanical damage due to fatigue.

Vibration absorbers are used to prevent vibrations in narrow frequency ranges. This type of passive systems does not operate effectively outside the frequency range to which they are adjusted (tuned). The prevention of vibrations within a wide frequency range can be provided by active or semi-active (adaptive) systems. These types of systems change the system parameters or generate control forces by monitoring the input and/or output vibrations. Accordingly, electronic control equipment such as sensor, actuator, control circuit, PLC or computer etc. is used in these systems. However, due to the presence of these components, the system becomes complicated. The production of these systems is rather complicated and results in costly products. Moreover, external electrical energy input is used by the electronic equipment within these systems. Therefore, electrical line, power supply or batteries are required.

As a result, all abovementioned problems have made it necessary to make an improvement in the relevant technical field.

SUMMARY

The present invention is related to a self-tuning and self-powered mechanical vibration isolation system to eliminate the abovementioned disadvantages and to bring new advantages to the relevant technical field.

An object of the invention is to provide a vibration isolation system with improved vibration isolation performance.

Another object of the invention is to provide a mechanical vibration isolation system that does not require any electronic sensors, actuators or control circuits for the self-tuning operation.

Another object of the invention is to provide a self-powered vibration isolation system that is powered by the input vibration which eliminates the need for electrical energy input for the self-tuning operation.

In order to achieve all of the abovementioned objects that will be understood from the following detailed description, the present invention is at least one vibration isolation system to be used particularly in vibration isolation, comprising mainly at least one first region and at least one second region that are positioned mutually, at least one first hinge member engaged with said first region, at least one second hinge member engaged with said second region and at least one lever connected with said first hinge member and said second hinge member to be at least partially movable in the direction of at least one first axis. Accordingly, the novelty herein is that at least one lever guiding element is positioned to minimize vibration transmission between the first region and the second region and said lever guiding element is configured to align an instantaneous center of rotation (instantaneous center of zero velocity) on said lever depending on the vibration frequency. The vibration source is in the first region and it is aimed to provide vibration isolation in the second region. Vibrations received from the first region to the lever slide the lever with respect to the hinges along one first axis and bring the instantaneous center of rotation under the second hinge that is connected to the second region which will be subjected to vibration isolation. Therefore, the vibration transmission between the first region and the second region is minimized.

Another possible embodiment of the invention is characterized in that the lever guiding element includes at least one wedge, pad or fin so as to contact the lever. Therefore, the vibration energy is used to control the vibration by contacting the lever with at least one wedge, pad or fin having elastic features.

Another possible embodiment of the invention is characterized in that said wedge is positioned to be aligned with the second hinge connected to the second region which is required to be isolated from vibration. Therefore, it is provided that the instantaneous center of rotation of the lever comes to the same point with this hinge.

Another possible embodiment of the invention is characterized in that said wedge comprises at least one first wedge and at least one second wedge. Therefore, the bidirectional movement of the lever in the first axis is provided by two wedges.

Another possible embodiment of the invention is characterized in that said first wedge and said second wedge make a predetermined wedge angle with at least one first axis. Therefore, the proportional control of the force to be formed by the lever that impacts the wedge and the formation of a component in the direction of the axis of the lever is provided.

Another possible embodiment of the invention is characterized in that the wedge angles of the first wedge and the second wedge are equal to each other.

Another possible embodiment of the invention is characterized in that the lever guiding element comprises at least one mass and the first and second wedges are positioned at equal distances from the central point of this mass.

Another possible embodiment of the invention is characterized in that the mass that carries the wedges is positioned on the vibration source (first region) by means of at least one elastic element such as a spring. The stiffness of this spring or elastic element is selected to be low and the natural frequency of the mass to which it is connected is provided to be well below the vibration isolation frequency range. Hence, the mass can be considered as an artificial ground mass. Therefore, the transmission of vibrations coming from the vibration source (first region) to the wedges is minimized.

The self-tuning vibration isolation system reaches the equilibrium position when the instantaneous center of zero velocity coincides with the second hinge member that is attached to the second region. At equilibrium position, the two wedges contact the lever at equal distances from the instantaneous center of zero velocity and create equal forces. Thus, the lever cannot move along the first axis. Moreover, at this position, antiresonance is achieved, hence vibration in the second region is minimized. If the lever is disturbed or the vibration frequency in the first region changes, then one of the wedges experiences higher vibration and that wedge generates a higher force and pushes the lever towards its side. As a result, the instantaneous center of zero velocity again coincides with the second hinge member that is attached to the second region and equilibrium is established.

The self-tuning vibration isolation system is also self-powered. The motion of the lever along the first axis is achieved by using the input vibrational energy coming from the first region. The wedges that are on the artificial ground mass use this input vibrational energy to tune the system. Moreover, the self-tuning action is achieved only by mechanical means (no electrical energy input or no electronic sensors, actuators or controllers).

BRIEF DESCRIPTION OF THE DRAWINGS

FIG. 2A shows an illustrative overlapped view of the motion created in case that a vibration below the resonance frequency ($f<f_p$) is applied to the lever-type vibration isolation system.

FIG. 2B shows an illustrative overlapped view of the motion created in case that a vibration at the resonance frequency ($f=f_p$) is applied to the lever-type vibration isolation system.

FIG. 2C shows an illustrative overlapped view of the motion created in case that a vibration at a frequency ($f_p<f<f_z$) between resonance and antiresonance frequency is applied to the lever-type vibration isolation system.

FIG. 2D shows an illustrative overlapped view of the motion created in case that a vibration at the antiresonance frequency ($f=f_z$) is applied to the lever-type vibration isolation system.

FIG. 2E shows an illustrative overlapped view of the motion created in case that a vibration above the antiresonance frequency ($f>f_z$) is applied to the lever-type vibration isolation system.

Figure 1:
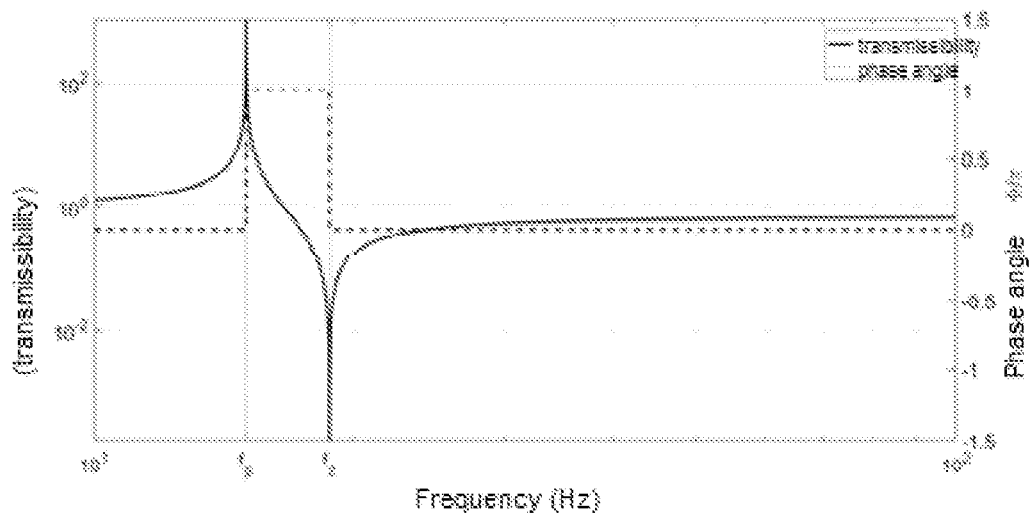
FIG. 1 shows an illustrative view of the transmissibility graph of an ordinary single-degree-of-freedom lever-type vibration isolation system.

In the figures, the reference numbers are as follows:
10 Vibration Isolation System
20 First Region
21 First Hinge Element
30 Second Region
31 Second Hinge Element
40 Bearing
50 Lever
51 Tip Mass
60 Lever Guiding Element
61 Wedge
61a First Wedge
61b Second Wedge
62 Mass
63 Spring
70 Isolation Element
(I) First Axis
(II) Instantaneous Center of Rotation
(III) Rotation Angle
(IV) Second Axis
(V) Wedge Angle

DETAILED DESCRIPTION OF THE EMBODIMENTS

In this detailed description, the subject of the invention is described by way of examples only for clarifying the subject matter such that no limiting effect is created.

The invention relates to at least one vibration isolation system (10) for isolating vibrations at a predetermined region. In a possible embodiment of the invention, the inventive vibration isolation system (10) is a lever (50) type isolator and does not transmit the vibration that occurs on one side (first region (20)) to the other side (second region (30)). The vibration isolation element (10) can be used in all fields such as the transportation industry including preferably automotive, marine transportation, railway and aviation, household appliances, energy sector, military industry, and machinery industry where variable frequency mechanical vibrations are required to be isolated.

Figure 3:
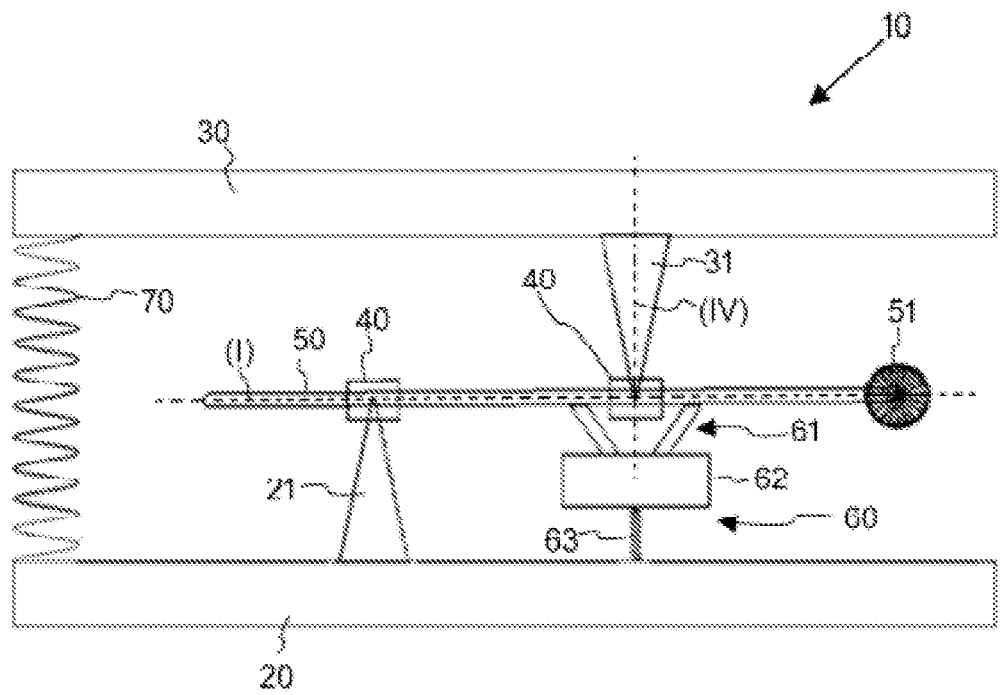
FIG. 3 shows an illustrative schematic view of the inventive vibration isolation system.

In FIG. 3, an illustrative schematic view of the inventive vibration isolation system (10) is presented. Accordingly, the vibration isolation system (10) has at least one first region (20) and at least one second region (30). Said first region (20) is the place where there is vibration source and said second region (30) is the region which is to be protected from vibration.

There is at least one isolation element (70) positioned between the first region (20) and the second region (30). In a possible embodiment of the invention, said isolation element (70) is an elastically deformable member, and in another possible embodiment of the invention, it exhibits resilience properties. The function of the isolation element (70) is to support loads between the first region (20) and the second region (30) under static conditions and to isolate any vibrations that may occur at least partially.

At least one hinge element (21) is engaged with the first region (20) and at least one second hinge element (31) is engaged with the second region (30). At least one bearing (40) is positioned on the first hinge element (21) and the second hinge element (31) that face each other. Said bearing (40) is configured such that at least one lever (50) is positioned therein and said lever (50) is allowed to translate at least partially along at least one first axis (I). Said first axis (I) is normally the extension direction of the lever (50). The lever (50) is connected to the first hinge element (21) and the second hinge element (31) by means of the bearings (40). The lever (50) can move at least partially on the first axis (I) by sliding along the bearings (40). Moreover, the first hinge element (21) and the second hinge element (31) allow rotation of the lever with respect to the first region (20) and the second region (30). Hence, the lever (50) can rotate and translate. At least one mass (51) can be positioned on the tip of the lever (50). Said tip mass (51) is a predetermined amount, and contributes to the isolation effect of the system by lowering the resonance frequency of the assembly.

In case of vibration, the lever (50) rotates about an instantaneous center of rotation (II) with small movements by means of the bearings (40) and forms at least one rotation angle (III) on the first axis (I). The magnitude of said rotation angle (III) changes due to the amplitude of the vibration, and the position of said instantaneous center of rotation (II) depends on the vibration frequency. The object of the invention is to move the lever (50) between the first hinge element (21) and the second hinge element (31) on the first axis (I) to align the instantaneous center of rotation (II) with the second hinge element (31) which is attached to the second region (30). In that case, no vibration is transmitted to the second region (30) and perfect vibration isolation is achieved.

There is at least one lever guiding element (60) in the vibration isolation system (10) to move the lever (50) on the first axis (I). Said lever guiding element (60) aligns the instantaneous center of rotation (II) of the lever (50) with the second hinge element (31) in the second region (30) where vibration is not desired by resting on the lever (50) and providing forces along the first axis (I). In a possible embodiment of the invention, the lever guiding element (60), which is positioned against the second hinge element (31) located in the second region (30) where vibration is not desired, positions the instantaneous center of rotation (II) and the second hinge element (31) on at least one second axis (IV) by sliding the lever (50) through bearings (40). Said second axis (IV) passes through the middle of the second hinge element (31) and it is perpendicular to the second region (30).

In a possible embodiment of the invention, the lever guiding element (60) is positioned on the first region (20), which is the vibration source, along the direction of the second axis (IV), which is the direction along which vibration isolation is to be carried out. The lever guiding element (60) has at least one mass (62). At least one spring (63) is positioned on one side of the mass (62) and at least one wedge (61) is positioned on the other side of the same. Said spring (63) is in fact an elastic element and provides the engagement of the mass (62) with the first region (20). The stiffness of the spring (63) is determined such that the natural frequency of the mass (62) to which it is connected is provided to be well below the vibration isolation frequency range. The spring (63) prevents the mass (62) from being affected by vibration by means of isolating the vibrations coming from the first region (20) where the vibration source is present. In a possible embodiment of the invention, in addition to the spring (63), there is at least one damper (not shown) to operate together with the spring (63). Said damper provides the mass (62) to stay stationary by damping the vibrations coming from the base or caused by the lever hitting the wedges during the operation of the system. The mass (62) is preferably large and is provided to remain stationary without being affected by the vibrations that may occur in the first region (20). Said wedge (61) moves the lever (50) on the first axis (I) with respect to the vibration to which the lever (50) is exposed, thus provides the instantaneous center of rotation (II) to be positioned on the second axis (IV). In a possible embodiment of the invention, the wedge (61) is made of a rubber material such that it can absorb energy. The wedge (61) is configured to transmit vibration and impact forces.

Figure 4:
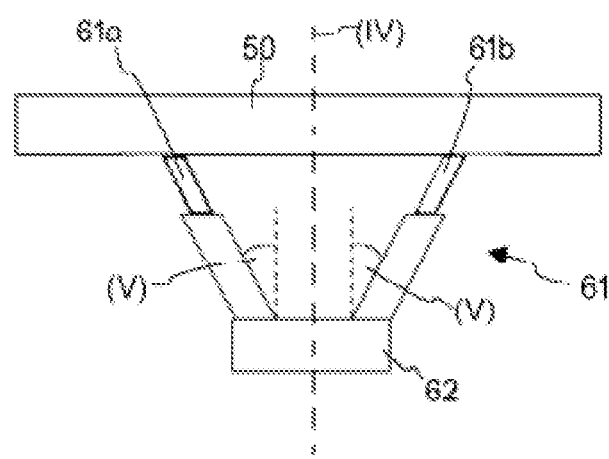
FIG. 4 shows an illustrative schematic view of the wedges of the inventive vibration isolation system positioned below the lever.

In FIG. 4, an illustrative schematic view of the wedge (61) positioned in the inventive vibration isolation system (10) is presented. Accordingly, the wedge (61) comprises at least one first wedge (61a) and at least one second wedge (61b). Said first wedge (61a) and said second wedge (61b) are substantially configured to move the lever (50) in opposite directions on the first axis (I) by hitting the lever (50) during the oscillations of the lever (50). Thus, the first wedge (61a) and the second wedge (61b) are positioned to form at least one wedge angle (V) between them and the second axis (IV). Said wedge angle (V) allows the lever to move on the first axis (I) by hitting the first wedge (61a) or the second wedge (61b) as a consequence of vibration. In a possible embodiment of the invention, wedge angles (V) for the first wedge (61a) and the second wedge (61b) are equal to each other. The lever moves upon the vibration of the first region (20). The lever (50) impacts the first wedge (61a) and the second wedge (61b) simultaneously during its movement. Since the first wedge (61a) and the second wedge (61b) make a wedge angle (V) at the movement of impact, two opposite forces that are parallel to the first axis (I) in proportion to the impact speeds are applied by the wedges to the lever (61).

Among these two opposite forces, the force where the lever (50) impacts with higher speed will be greater, so a net force that pushes the lever (50) in that direction occurs. Consequently, the lever (50) moves in the direction of the net force. When the instantaneous center of rotation (II) is aligned with the second axis (IV), the movement of the lever (50) in the first axis (I) is fixed because the speeds on the two wedges (61) are the same. Therefore, the second hinge element (31) aligns with the instantaneous center of rotation (II) and prevents the transmission of vibration to the second region (30).

In FIG. 1, an illustrative view of the transmissibility graph of a representative lever-type vibration isolation system (10) is presented. There is one resonance frequency ($f_p$) and one antiresonance frequency ($f_z$). Transmissibility is the ratio of output to input vibration amplitude. At resonance, transmissibility is very large and at antiresonance transmissibility is very low. Here, there is no self-tuning action. Hence, the resonance frequency ($f_p$) and the antiresonance frequency ($f_z$) remain constant as the excitation frequency (f) changes.

In FIGS. 2A-2E, the lever guiding element (60) is not considered and hence the position of the instantaneous center of rotation remains fixed for a fixed excitation frequency (f). Hence, in FIGS. 2A-2E, self-tuning action is not considered.

Figure 2A:
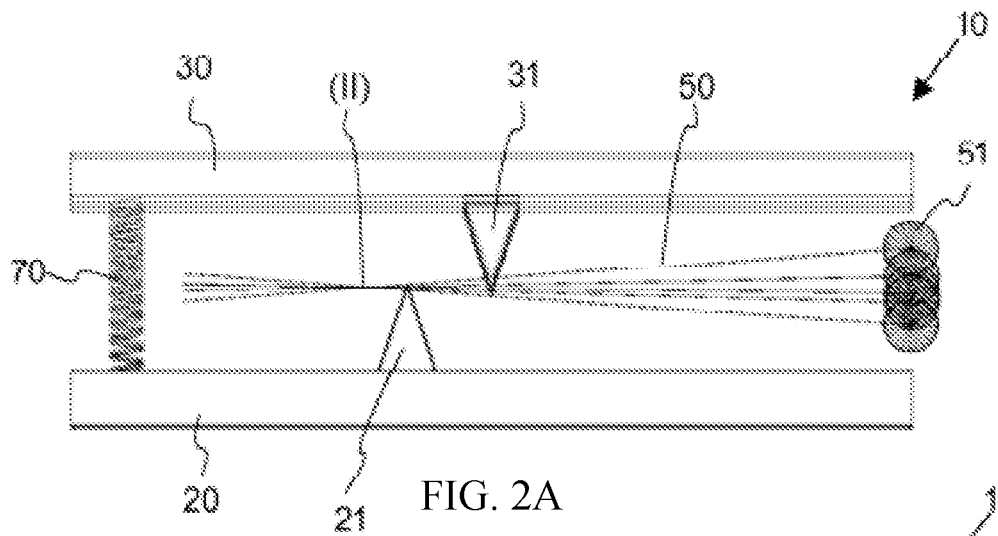
In FIGS. 2A-2E, self-tuning action is not considered so that the resonance frequency ($f_p$) and antiresonance frequency ($f_z$) remain unchanged when excitation frequency (f) is applied.

In FIG. 2A, an illustrative overlapped view of the motion created in case that a vibration below the resonance frequency ($f<f_p$) is applied to the lever-type vibration isolation system (10) is presented. In case that a vibration below the resonance frequency (f<$f_p$) is applied to the lever-type vibration isolation system (10) from the first region (20), the instantaneous center of rotation (II) is positioned outside the first hinge element (21) and the second hinge element (31).

Figure 2B:
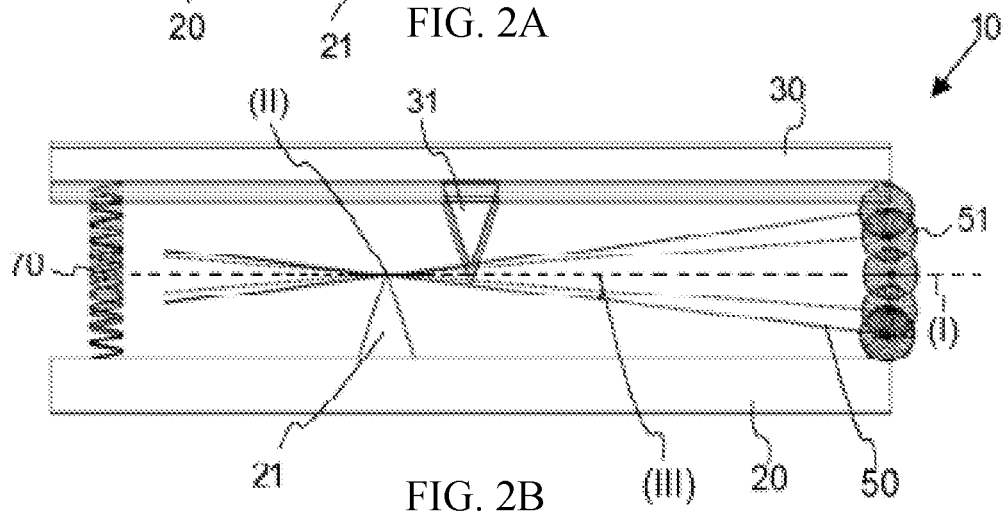

In FIG. 2B, an illustrative overlapped view of the motion created in case that a vibration at the resonance frequency (f=$f_p$) is applied to the lever-type vibration isolation system (10) is presented. Accordingly, in case that a vibration at the resonance frequency (f=$f_p$) is applied to the lever-type vibration isolation system (10) from the first region (20), the instantaneous center of rotation (II) coincides with the first hinge element (21).

Figure 2C:
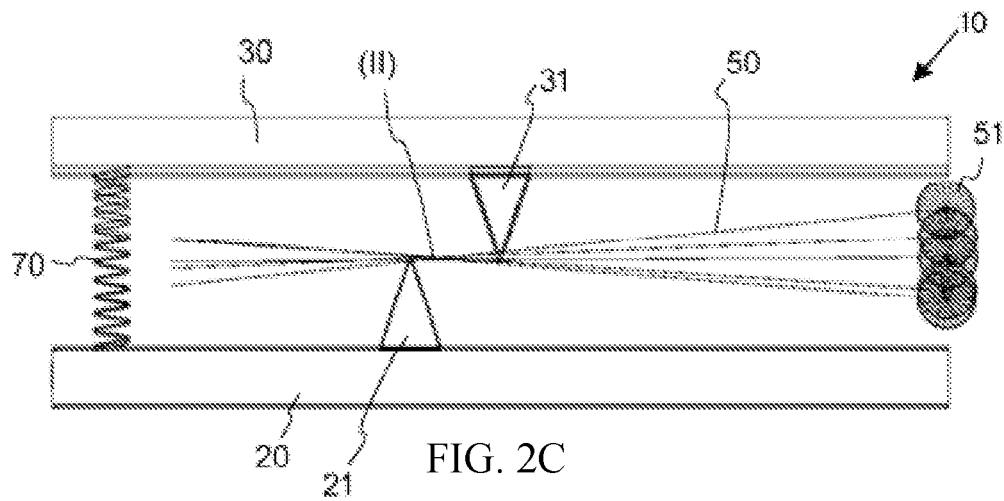

In FIG. 2C, an illustrative overlapped view of the motion created in case that a vibration at a frequency ($f_p$<f<$f_z$) between resonance and antiresonance frequency is applied to the lever-type vibration isolation system (10) is presented. Accordingly, in case that a vibration at a frequency ($f_p$<f<$f_z$) between resonance and antiresonance frequency is applied to the lever-type vibration isolation system (10) from the first region (20), the instantaneous center of rotation (II) is positioned between the first hinge element (21) and the second hinge element (31).

Figure 2D:
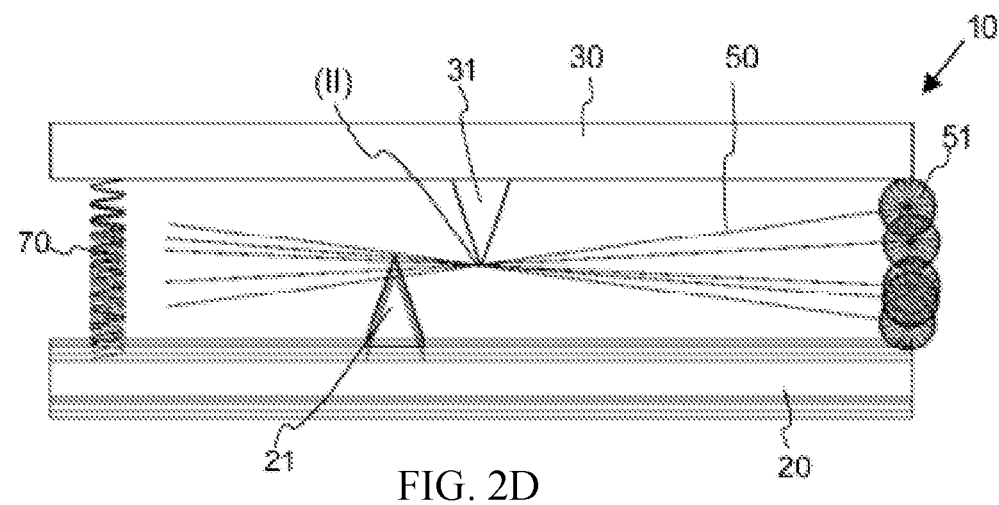

In FIG. 2D, an illustrative overlapped view of the motion created in case that a vibration at the antiresonance frequency (f=$f_z$) is applied to the lever-type vibration isolation system (10) is presented. Accordingly, in case that a vibration at an antiresonance frequency (f=$f_z$) is applied to the lever-type vibration isolation system (10) from the first region (20), the instantaneous center of rotation (II) is aligned with the second hinge element (31) on the second axis (IV). Since the instantaneous center of rotation (II) is stationary, the second region (30) is prevented from vibrating.

Figure 2E:
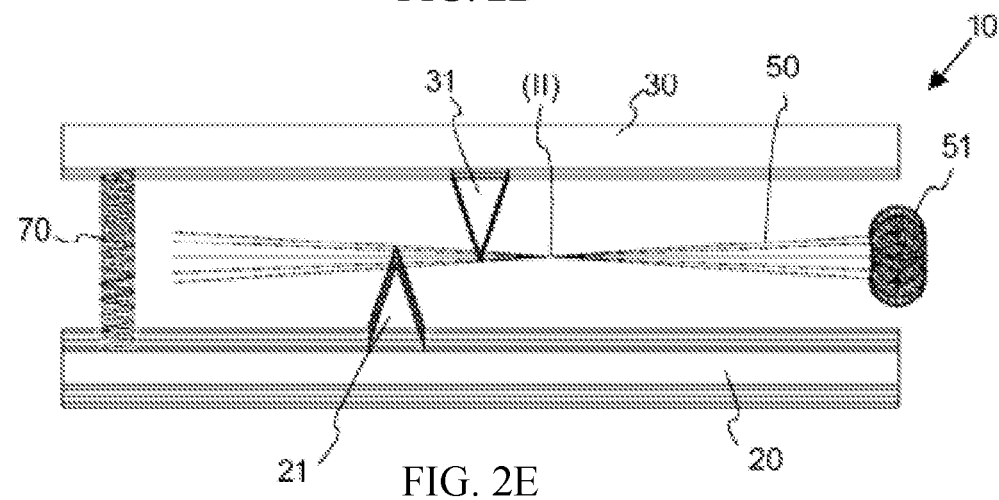

In FIG. 2E, an illustrative overlapped view of the motion created in case that a vibration above the antiresonance frequency (f>$f_z$) is applied to the lever-type vibration isolation system (10) is presented. In case that a vibration above the antiresonance frequency (f>$f_z$) is applied to the lever-type vibration isolation system (10) from the first region (20), the instantaneous center of rotation (II) is positioned outside the first hinge element (21) and the second hinge element (31).

When the lever guiding element (60) is used in the system, the resonance frequency ($f_p$) and the antiresonance frequency ($f_z$) change as a function of the lever position. The antiresonance frequency ($f_t$) of the system is brought to the excitation frequency (f) by moving the lever (50) in the direction of axis (I) with the forces created by the wedges regardless of the position of the instantaneous center of rotation (II), by means of mutual wedges (61a and 61b) operating oppositely. In this case, the instantaneous center of rotation comes under the second hinge (31) and the vibration transmitted to the second region (30) is minimized. In essence, the antiresonance frequency ($f_t$) of the vibration isolation system (10) tracks the input vibration frequency (f) and the vibration isolation system (10) always moves to the antiresonance condition even if the input excitation frequency (f) changes.

With this entire configuration, the vibrations are provided to be fully isolated (insulated) mechanically, by using energy of the mechanical vibrations (without external electrical energy input, power supply or battery, etc.) that shakes the vibration isolation system (10) as passive adaptive (not including electronic control equipment such as sensor, actuator, control circuit, PLC or computer etc.). Moreover, the vibration isolation system (10) provides a cheap and safe solution.

The protection scope of the invention is specified in the appended claims and cannot be limited to the description made for illustrative purposes in this detailed description. Likewise, it is clear that a person skilled in the art can present similar embodiments in the light of the above descriptions without departing from the main theme of the invention.

The invention claimed is:

1. A vibration isolation system, comprising:
at least one first region and at least one second region, wherein the at least one first region and the at least one second region are located mutually;
at least one first hinge element engaged with the at least one first region;
at least one second hinge element engaged with the at least one second region;
at least one lever connected with the at least one first hinge member and the at least one second hinge member so that the at least one lever is at least partially movable in a direction of at least one first axis to alter a resonance frequency of the vibration isolation system and an antiresonance frequency of the vibration isolation system; and
at least one lever guiding element positioned to minimize vibration transmission between the at least one first region and the at least one second region, wherein the at least one lever guiding element is configured to hit the at least one lever towards the at least one second hinge element to move an instantaneous center of rotation of the at least one lever so that said instantaneous center of rotation is moved, from a position away from the at least one second hinge element, to the at least one second hinge element such that the instantaneous center of rotation is aligned with and coincides with the at least one second hinge element to achieve an antiresonance condition at which a vibration in the second region is minimized.

2. The vibration isolation system according to claim 1, wherein the at least one lever guiding element includes at least one wedge to contact the at least one lever.

3. The vibration isolation system according to claim 2, wherein the at least one wedge is mutually positioned to be in alignment with the at least one second hinge element connected to the at least one second region, and the at least one second region is required to be isolated from vibration.

4. The vibration isolation system according to claim 2, wherein the at least one wedge comprises at least one first wedge and at least one second wedge.

5. The vibration isolation system according to claim 4, wherein the at least one first wedge and the at least one second wedge comprise a predetermined wedge angle between the at least one first wedge and the at least one second wedge with the at least one first axis.

6. The vibration isolation system according to claim 4, wherein predetermined wedge angles of the at least one first wedge and the at least one second wedge are equal to each other.

7. The vibration isolation system according to claim 4, wherein the at least one first wedge and the at least one second wedge are at equal distance from an axis in a middle of the at least one second hinge element.

8. The vibration isolation system according to claim 1, wherein the at least one lever guiding element comprises at least one mass and the at least one mass is positioned on the first region by an elastic element, and the elastic element comprises at least one spring.

9. The vibration isolation system according to claim 8, wherein the at least one mass is connected to the elastic element and a natural frequency of the at least one mass is below a predetermined vibration isolation frequency range of the at least one first region.

10. The vibration isolation system according to claim 1, wherein the at least one lever guiding element guides the at least one lever along the first axis in a direction when the at least one lever is disturbed externally or an input excitation frequency changes in order to bring the instantaneous center of rotation to coincide with the at least one second hinge element.

11. The vibration isolation system according to claim 1, wherein the at least one lever guiding element is a mechanical system without electronic sensors, actuators or control circuits for a self-tuning operation.

12. The vibration isolation system according to claim 1, wherein the at least one lever guiding element is a self-powered system powered by an input vibration coming from the at least one first region.

13. The vibration isolation system according to claim 5, wherein the predetermined wedge angles of the at least one first wedge and the at least one second wedge are equal to each other.

14. The vibration isolation system according to claim 5, wherein the at least one first wedge and the at least one second wedge are at equal distance from an axis in a middle of the at least one second hinge element.

* * * * *